United States Patent
Tolentino et al.

(10) Patent No.: US 9,381,893 B2
(45) Date of Patent: Jul. 5, 2016

(54) WINDSHIELD WIPER CONNECTOR (75) Inventors: Vambi Raymundo Tolentino, Coconut Creek, FL (US); Robert Peter Peers, Boca Raton, FL (US)

(73) Assignee: Pylon Manufacturing Corp., Deerfield Beach, FL (US)

( * ) Notice: Subject to any disclaimer, the term of this patent is extended or adjusted under 35 U.S.C. 154(b) by 109 days.

(21) Appl. No.: 13/560,585

(22) Filed: Jul. 27, 2012

(65) Prior Publication Data
US 2013/0185889 A1   Jul. 25, 2013

Related U.S. Application Data (60) Provisional application No. 61/513,011, filed on Jul. 29, 2011.

(51) Int. Cl.
B60S 1/40    (2006.01)
B60S 1/38    (2006.01)

(52) U.S. Cl.
CPC ......... B60S 1/4006 (2013.01); B60S 1/407 (2013.01); B60S 1/4077 (2013.01); B60S 2001/408 (2013.01)

(58) Field of Classification Search
CPC ...... B60S 1/4067; B60S 1/407; B60S 1/4074; B60S 1/4077; B60S 2001/4067; B60S 2001/4077; B60S 2001/408
USPC ............. 15/250.32, 250.361, 250.44–250.48, 15/250.201, 250.451
See application file for complete search history.

(56) References Cited

U.S. PATENT DOCUMENTS

| D56,762   | S | 12/1920 | Minier |
| 2,310,751 | A | 2/1943  | Scinta |
| 2,550,094 | A | 4/1951  | Smulski |
| 2,589,339 | A | 3/1952  | Carson |
| 2,616,112 | A | 11/1952 | Smulski |
| 2,643,411 | A | 6/1953  | Nesson |
| 2,799,887 | A | 7/1957  | Nemic |
| 2,801,436 | A | 8/1957  | Scinta |
| 2,814,820 | A | 12/1957 | Elliot et al. |

(Continued)

FOREIGN PATENT DOCUMENTS

| DE | 10343571 A1 * | 4/2005  | ............... B60S 1/40 |
| EP | 1612113       | 1/2006  | |
| FR | 2747976       | 10/1997 | |

OTHER PUBLICATIONS

International Search Report mailed Oct. 19, 2012 for PCT/US2012/048843 filed Jul. 30, 2012.

(Continued)

*Primary Examiner* — Monica Carter
*Assistant Examiner* — Andrew A Horton
(74) *Attorney, Agent, or Firm* — Feldman Gale, P.A.

(57) ABSTRACT

A connector for a windshield wiper, and a wiper blade assembly including same, that accommodates multiple pin-type windshield wiper arms having varying pin lengths and locking mechanisms. The connector for connecting a windshield wiper assembly to a wiper arm may have a peripheral wall having at least two opposing peripheral side walls and a top surface extending from one of the two opposing peripheral side walls to the other. The opposing peripheral side walls may each have a retaining pin aperture aligned with one another and sized to be capable of slidably accepting a retaining pin of at least one pin-type windshield wiper arm.

18 Claims, 6 Drawing Sheets

(56) References Cited

U.S. PATENT DOCUMENTS

| | | |
|---|---|---|
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,507 A | 9/1964 | Glynm |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,537 A | 3/1975 | Bianchi |
| 3,879,793 A | 4/1975 | Schlegel |
| 3,881,213 A | 5/1975 | Tilli |
| 3,881,214 A | 5/1975 | Palu |
| D236,337 S | 8/1975 | Deibel |
| 3,942,212 A | 3/1976 | Steger et al. |
| D240,809 S | 8/1976 | Deibel |
| 3,995,347 A | 12/1976 | Kohler |
| 4,007,511 A | 2/1977 | Deibel |
| 4,028,770 A | 6/1977 | Appel |
| 4,047,480 A | 9/1977 | Vassiliou |
| 4,063,328 A | 12/1977 | Arman |
| D248,388 S | 7/1978 | Hughes |
| 4,102,003 A | 7/1978 | Hancu |
| 4,127,912 A | 12/1978 | Deibel et al. |
| 4,127,916 A | 12/1978 | Van den Berg et al. |
| D257,339 S | 10/1980 | Ellinwood |
| 4,308,635 A | 1/1982 | Maiocco |
| 4,309,790 A | 1/1982 | Bauer et al. |
| 4,339,839 A | 7/1982 | Knights |
| 4,343,063 A | 8/1982 | Batt |
| 4,354,293 A * | 10/1982 | Le Sausse et al. ......... 15/250.32 |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,741,071 A | 5/1988 | Bauer et al. |
| D296,317 S | 6/1988 | Mower et al. |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| D353,354 S | 12/1994 | Oyama |
| 5,383,248 A * | 1/1995 | Ho ............................ 15/250.32 |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |

(56) References Cited

U.S. PATENT DOCUMENTS

| | | |
|---|---|---|
| 5,412,177 A | 5/1995 | Clark |
| 5,454,135 A | 10/1995 | Okuya et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| 5,509,166 A | 4/1996 | Wagner et al. |
| D370,199 S | 5/1996 | Kim |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| D375,289 S | 11/1996 | Waselewski et al. |
| 5,577,292 A | 11/1996 | Blachetta et al. |
| D376,792 S | 12/1996 | Chodkiewicz |
| D377,754 S | 2/1997 | Abbott et al. |
| D379,613 S | 6/1997 | Chen |
| D382,848 S | 8/1997 | Chen |
| 5,661,870 A | 9/1997 | Eustache et al. |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| D402,953 S | 12/1998 | Kim |
| D404,354 S | 1/1999 | Witek et al. |
| D406,094 S | 2/1999 | Lai |
| D406,257 S | 3/1999 | Lee |
| 5,875,672 A | 3/1999 | Fourie et al. |
| 5,885,023 A * | 3/1999 | Witek et al. ................. 403/321 |
| D411,161 S | 6/1999 | Wooten |
| D411,504 S | 6/1999 | Hsu |
| 5,907,885 A | 6/1999 | Tilli et al. |
| 5,920,947 A | 7/1999 | Varner |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,055,697 A | 5/2000 | Wollenschlaeger |
| 6,063,216 A | 5/2000 | Damm et al. |
| D427,134 S | 6/2000 | Lee |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,292,974 B1 | 9/2001 | Merket et al. |
| 6,295,690 B1 | 10/2001 | Merkel et al. |
| 6,301,742 B1 | 10/2001 | Kota |
| 6,305,066 B1 | 10/2001 | De Paolo et al. |
| 6,308,373 B1 | 10/2001 | Merkel et al. |
| 6,327,738 B1 | 12/2001 | Lewis |
| 6,332,236 B1 * | 12/2001 | Ku ................. 15/250.32 |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| D462,044 S | 8/2002 | Gfatter et al. |
| 6,427,282 B1 | 8/2002 | Kotlarski |
| 6,434,780 B1 | 8/2002 | Kotlarski |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,516,491 B2 | 2/2003 | Merkel et al. |
| 6,523,218 B1 | 2/2003 | Kotlarski |
| 6,530,111 B1 | 3/2003 | Kotlarski |
| D472,510 S | 4/2003 | Lin |
| D473,180 S | 4/2003 | Sun |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| D494,125 S | 8/2004 | Leu |
| D494,527 S | 8/2004 | Hsu |
| D494,528 S | 8/2004 | Chiang |
| 6,789,289 B2 * | 9/2004 | Roodt ................. 15/250.32 |
| 6,792,644 B2 * | 9/2004 | Roodt ................. 15/250.32 |
| 6,796,000 B2 | 9/2004 | Varner |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |

(56) References Cited

U.S. PATENT DOCUMENTS

| | | | |
|---|---|---|---|
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,512 B2 | 12/2005 | Dietrich et al. |
| 7,007,339 B2 | 3/2006 | Weilet et al. |
| 7,024,722 B2 | 4/2006 | Neubauer et al. |
| 7,036,181 B2 | 5/2006 | Zimmer |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,795 B2 | 12/2006 | Javaruski et al. |
| 7,166,979 B2 | 1/2007 | Zimmer |
| D538,218 S | 3/2007 | Elwell et al. |
| 7,196,440 B2 | 3/2007 | Lamprecht |
| 7,228,588 B2 | 6/2007 | Kraemer et al. |
| D547,713 S | 7/2007 | Goeller |
| D549,152 S | 8/2007 | Goeller |
| 7,256,565 B2 | 8/2007 | Merkel et al. |
| 7,257,856 B2 | 8/2007 | Zimmer |
| 7,272,890 B2 | 9/2007 | Zimmer et al. |
| 7,281,294 B2 | 10/2007 | Wilms et al. |
| 7,293,321 B2 | 11/2007 | Breesch |
| 7,299,520 B2 | 11/2007 | Huang |
| 7,316,047 B2 * | 1/2008 | Thienard .................... 15/250.32 |
| 7,316,048 B2 | 1/2008 | Yamane et al. |
| 7,337,900 B2 | 3/2008 | Reiber et al. |
| 7,353,562 B2 * | 4/2008 | Huang ....................... 15/250.32 |
| 7,370,385 B2 | 5/2008 | Chiang |
| D573,457 S | 7/2008 | Park |
| 7,398,577 B2 | 7/2008 | Genet |
| D577,324 S | 9/2008 | McCray |
| D579,849 S | 11/2008 | Garrastacho et al. |
| 7,451,520 B2 | 11/2008 | Weiler et al. |
| 7,464,433 B2 | 12/2008 | Thomar et al. |
| 7,472,451 B2 | 1/2009 | Hara et al. |
| D586,716 S | 2/2009 | Radfar |
| 7,484,264 B2 | 2/2009 | Kraemer et al. |
| 7,493,672 B2 | 2/2009 | Op't Roodt |
| 7,506,401 B2 * | 3/2009 | Park .......................... 15/250.32 |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,526,832 B2 | 5/2009 | Matsumoto et al. |
| D593,480 S | 6/2009 | Kim |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| 7,669,276 B2 | 3/2010 | Verelst et al. |
| 7,687,565 B2 | 3/2010 | Geilenkirchen |
| 7,690,073 B2 | 4/2010 | Marmoy et al. |
| D615,918 S | 5/2010 | Kim |
| 7,707,680 B2 | 5/2010 | Hawighorst et al. |
| 7,716,780 B2 | 5/2010 | Scholl et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer |
| 7,908,703 B2 | 3/2011 | Van Bealen |
| 7,908,704 B2 | 3/2011 | Kraemer |
| 7,921,503 B1 * | 4/2011 | Chiang ..................... 15/250.32 |
| 7,930,796 B2 | 4/2011 | Weiler et al. |
| D637,132 S | 5/2011 | Kim |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabbe et al. |
| 7,989,955 B2 | 8/2011 | Yagi |
| 7,996,953 B2 | 8/2011 | Braun et al. |
| 8,020,246 B2 | 9/2011 | Bauer et al. |
| 8,020,248 B2 | 9/2011 | Hasegawa |
| 8,020,249 B2 | 9/2011 | Masuda et al. |
| 8,026,645 B2 | 9/2011 | Stubner et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,181,308 B2 | 5/2012 | Kwon et al. |
| 8,261,403 B2 | 9/2012 | Ehde |
| 8,261,405 B2 | 9/2012 | Kim et al. |
| 2002/0043092 A1 | 4/2002 | Jones et al. |
| 2002/0112306 A1 | 8/2002 | Komerska |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0159229 A1 | 8/2003 | Weiler et al. |
| 2003/0209049 A1 | 11/2003 | Jones et al. |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0177970 A1 | 8/2005 | Scholl et al. |
| 2006/0010636 A1 | 1/2006 | Vacher |
| 2006/0112511 A1 | 6/2006 | Op't Roodt et al. |

(56) References Cited

U.S. PATENT DOCUMENTS

| | | |
|---|---|---|
| 2006/0117515 A1 | 6/2006 | Fink et al. |
| 2006/0130263 A1* | 6/2006 | Coughlin ................... 15/250.32 |
| 2006/0156529 A1 | 7/2006 | Thomar et al. |
| 2006/0218740 A1 | 10/2006 | Coughlin |
| 2006/0230571 A1 | 10/2006 | Son |
| 2006/0282972 A1 | 12/2006 | Huang |
| 2007/0067941 A1 | 3/2007 | Huang |
| 2007/0089257 A1 | 4/2007 | Harita et al. |
| 2007/0186366 A1 | 8/2007 | Alley |
| 2007/0226940 A1 | 10/2007 | Thienard |
| 2007/0226941 A1 | 10/2007 | Kraemer et al. |
| 2008/0083082 A1 | 4/2008 | Rovaart et al. |
| 2008/0092320 A1* | 4/2008 | Cempura et al. ......... 15/250.201 |
| 2009/0013492 A1 | 1/2009 | Henin |
| 2009/0064440 A1 | 3/2009 | Boland |
| 2009/0126140 A1* | 5/2009 | Heinrich et al. ........... 15/250.32 |
| 2009/0151110 A1* | 6/2009 | Ku ............................ 15/250.32 |
| 2009/0158545 A1 | 6/2009 | Grasso et al. |
| 2010/0005608 A1 | 1/2010 | Chien |
| 2010/0005609 A1 | 1/2010 | Kim |
| 2010/0024151 A1 | 2/2010 | Ku |
| 2010/0083454 A1 | 4/2010 | Op't Roodt et al. |
| 2010/0205763 A1* | 8/2010 | Ku ............................. 15/250.32 |
| 2010/0236008 A1 | 9/2010 | Yang et al. |
| 2010/0236675 A1 | 9/2010 | Schneider |
| 2010/0242204 A1 | 9/2010 | Chien |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277266 A1 | 11/2011 | Umeno |
| 2012/0027206 A1 | 2/2012 | Suzuki et al. |
| 2012/0047673 A1* | 3/2012 | Depondt ................... 15/250.32 |
| 2012/0102669 A1 | 5/2012 | Lee et al. |
| 2012/0159733 A1 | 6/2012 | Kwon |
| 2012/0180245 A1 | 7/2012 | Ku |
| 2012/0180246 A1 | 7/2012 | Ku |

OTHER PUBLICATIONS

International Search Report mailed Sep. 19, 2012 for PCT/US2012/048617 filed Jul. 27, 2012.

International Search Report mailed Sep. 19, 2012 for PCT/US2012/048262 filed Jul. 26, 2012.

* cited by examiner

Prior Art

Figure 17

Prior Art

WINDSHIELD WIPER CONNECTOR

CROSS REFERENCE TO RELATED APPLICATIONS

This application claims the benefit of U.S. Provisional Application No. 61/513,011 filed Jul. 29, 2011, the disclosure of which is hereby incorporated herein by reference in its entirety.

TECHNICAL FIELD

This invention relates in general to windshield wipers, and more particularly, to an improved connector for a windshield wiper that allows the windshield wiper to be attached to multiple pin-type windshield wiper arm configurations. The invention is also directed to windshield wipers incorporating these novel connectors.

BACKGROUND OF THE INVENTION

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with this problem.

The need to attach replacement windshield wiper blades to multiple arms has been addressed to some degree. For example, windshield wiper blades have been designed to work with various hook-type wiper arms having different sizes. Connectors may also be configured to receive either a pin-type arm or a hook arm. While these connectors may increase the usefulness of a given windshield wiper such that it can be used with different wiper arm types, the connectors are often expensive and have a complicated structure that is difficult and time-consuming to manufacture.

More recent side pin arms are described in U.S. Pat. No. 6,553,607. These side pin arms do not have the reduced radius groove found in traditional pin arms (which was used to lock the pin in place), in favor of a constant-radius pin. Such arms use a locking mechanism with a locking tab that is designed to extend from one side of the wiper blade to the other and secure the arm in place laterally, while the pin secures the wiper blade from longitudinal movement. These wiper arms (sometimes referred to herein as "pin-plus-locking-arm") are generally provided on vehicles with a specially designed wiper blade that is designed to connect only to that specific type of arm. Thus, when the wiper blade must be replaced, the replacement must generally be done at a car dealership and requires the purchase of an expensive replacement part. Moreover, there are several versions of these pin-plus-locking-arm wiper arms, some of which have varying lengths, locking arms or spacers. Accordingly, an aftermarket provider that offers windshield wipers that are not directed to a specific car must evaluate whether to add a separate connector to accommodate each particular pin-plus-locking-arm wiper arms (in addition to the connectors that accommodate the various size hook arms, traditional pin arms, etc.). This leaves consumers with vehicles having the new pin-plus-locking-arm wiper arms with fewer, usually more expensive, alternatives for replacement windshield wipers.

Thus, there is a need for inexpensive connectors that are capable of securing a windshield wiper blade to a variety of arms, including pin-plus-locking-arm wiper arms. In particular, it would be desirable to have a connector that can be attached to a wiper blade that will allow the wiper blade to be locked to a wide variety of these pin-type wiper arms despite their various locking arm mechanisms and regardless of whether the arm includes a spacer. It would also be desirable to have a windshield wiper connector that can be fabricated or molded as a single piece at low-cost, and that can accommodate a wide variety of these pin-type wiper arms. The prior art fails to provide a low-cost windshield wiper connector capable of attachment to a wide variety of these pin-type windshield wiper arms, much less for the purpose of reducing the amounts of inventory parts required to supply a vehicle market that uses a wide variety of pin-type windshield wiper arm types.

SUMMARY OF THE INVENTION

This invention is generally directed to novel connectors for windshield wiper blades. More particularly, the invention relates, in part, to a single piece windshield wiper connector that can accommodate multiple pin-type windshield wiper arms having varying pin lengths and locking mechanisms. In certain embodiments the connector for connecting a windshield wiper assembly to a wiper arm may have a peripheral wall having at least two opposing peripheral side walls and a top surface extending from one of the two opposing peripheral side walls to the other. The opposing peripheral side walls may each have a retaining pin aperture aligned with one another and sized to be capable of slidably accepting a retaining pin of at least one pin-type windshield wiper arm. The invention is also directed to wiper blades incorporating the connectors described herein.

DETAILED DESCRIPTION OF THE PREFERRED EMBODIMENT

In one aspect, the invention is generally directed to a connector 1 for a windshield wiper (or a windshield wiper incorporating same) that allows one windshield wiper to be secured to multiple windshield wiper arms, each having a different configuration. In this aspect, the connector 1 may be designed for use with multiple different windshield wiper arms that use transverse retaining pins 22 and locking arms 21 that secure the windshield wiper to the windshield wiper arm.

In certain embodiments the connector for connecting a windshield wiper assembly to a wiper arm may have a peripheral wall having at least two opposing peripheral side walls and a top surface extending from one of the two opposing peripheral side walls to the other. The opposing peripheral side walls may each have a retaining pin aperture aligned with one another and sized to be capable of slidably accepting a retaining pin of at least one pin-type windshield wiper arm.

In some embodiments, the connector may further have an aperture in the top surface sized such that it is capable of accepting a first locking tab that extends from a locking arm on a first pin-type of windshield wiper arm. The distance between the outside surfaces of the peripheral side walls may be such that the connector is capable of being attached to a second pin-type windshield wiper arm, such that a second locking arm of the second pin-type windshield wiper arm extends past the at least two opposing peripheral side walls of the connector and the locking tab extends along an outer surface of one of the at least two opposing peripheral side walls of the connector.

In some embodiments, the top surface of the connector may further have a proximal shelf and a distal shelf such that the connector is capable of having the bottom side of the first and/or second locking arms of the first and/or second pin-type windshield wiper arms rest on the proximal shelf when the connector is locked to each of the first pin-type and second pin-type windshield wiper arms. In some of these embodiments, the proximal distal shelf of the connector may be sloped.

In some embodiments, the connector may have at least two internal support walls, and at least one rivet passage and arcuate rivet clip in each of the internal support walls for accepting and securing a rivet of a wiper blade, thereby securing the connector to the wiper blade. In some of these embodiments, the connector may be capable of being secured to the mounting base of a windshield wiper blade assembly via the rivet through the mounting base.

In some embodiments the connector may have a distal shelf and may be capable of connecting to a pin-type wiper arm having a horizontal extension extending from a locking arm substantially to the end of the distal shelf, and the top surface of the connector has clearance for the horizontal extension.

In some of these embodiments the connector may also have internal support walls extending downward from the top surface, and substantially along the longitudinal length of the connector. In some embodiments the connector may also have at least one rivet aperture in each of the at least two opposing peripheral side walls capable of accepting a rivet of a mounting base of a wiper blade in order to secure the connector the wiper blade assembly.

In some embodiments the connector may be fabricated as a single piece.

In some embodiments, the top surface of the connector may also have a proximal shelf and a distal shelf; and the connector is capable of connecting to the at least one pin-type wiper arm such that a bottom side of a locking arm of the at least one pin-type windshield wiper arm rests on the distal shelf when the connector is locked to the at least one pin-type windshield wiper arm. In some of these embodiments the distal shelf may be recessed.

In some embodiments, an aperture in the top surface may be positioned to be capable of receiving a locking tab of the locking arm of a pin-type windshield wiper arm when the connector is locked to the windshield wiper arm such that the connector may be prevented from sliding off of the windshield wiper arm.

In some embodiments the connector may also have a spacer cavity in a peripheral side wall sized to be capable of accepting a spacer of a pin-type wiper arm having a spacer.

In some embodiments a wiper blade assembly has a wiper blade and a connector capable of connecting to the wiper blade and further capable of connecting the wiper blade to at least two different pin-type wiper arms wherein each of the at least two different pin-type wiper arms has a locking arm.

In some of these embodiments the at least two different pin-type wiper arms include at least one pin-type wiper arm having a locking tab extending past the arm's pin; and at least one other pin-type wiper arm having a locking tab that does not extend past the other arm's pin. In some embodiments, the at least two different pin-type wiper arms may include at least one pin-type wiper arm having a spacer on the arm's pin; and at least one other pin-type wiper arm that does not have a spacer on the other arm's pin.

In some embodiments, the wiper blade assembly may have a connector that can connect to the wiper blade by passing a rivet on the wiper blade through at least two rivet passages on the connector, into at least two arcuate rivet clips on the connector. In some embodiments, the wiper blade assembly may have a connector having a peripheral wall having at least two opposing side walls, a top surface, an aperture in the top surface sized to accept a windshield wiper arm locking tab that extends from a locking arm on a windshield wiper arm. The connector's opposing peripheral side walls may each have a retaining pin aperture aligned with one another and sized to be capable of slidably accepting a retaining pin on a windshield wiper arm.

In some embodiments, a wiper blade assembly may have a wiper blade having a rivet and a connector having a peripheral wall having two opposing side walls, a spacer cavity in at least one of the two opposing side walls, a top surface having a flat distal shelf and a sloped proximal shelf, a locking aperture capable of receiving the locking tab of a pin-type wiper arm, at least two internal support walls, each of the two internal support walls having a rivet passage and an arcuate rivet clip, a retaining pin aperture extending through the two opposing side walls and the two internal support walls, and a width between the opposing side walls of the peripheral wall that is different at the proximal shelf than the width between the opposing side walls at the distal shelf.

The connector 1 is preferably configured with a side-to-side aperture (15*a*, 15*b*, 15*c*, 15*d*) to accommodate a retaining pin 22. Depending on the arms desired to be accommodated by the connector, the aperture 15 need not extend completely through the connector. However for greater wiper arm coverage, it is preferred that the aperture 15 go through both sides of the connector 1. In addition, the top surface of the connector may provide one or more apertures 7 and an outside edge to accommodate locking tabs 24 on the locking arms 21 of the varying sizes and configurations of pin-type windshield wiper arms.

In addition, the connector is configured such that the orientation of either the windshield wiper or the connector can be reversed based on the particular windshield wiper arm that is being used.

Figure 1:
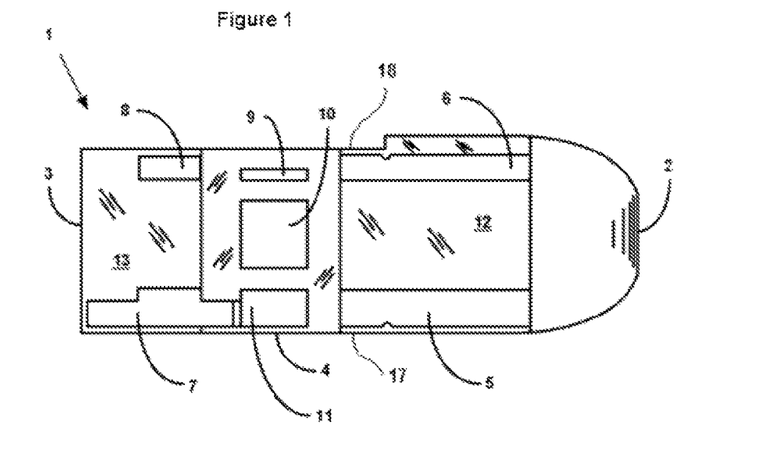
FIG. 1 is a top view of a preferred embodiment of the connector that illustrates the aperture and outside edge used to accommodate different locking tab configurations.

FIG. 1 is a top view of a preferred embodiment of the connector 1. The connector 1 has a distal end 2, and a proximal end 3. A peripheral wall 4 extends around the periphery of connector 1. The peripheral wall 4 including a proximal portion, a distal portion, and opposing side portions that connect the proximal and distal portions, referred to as a first side 17 and a second side 18. A top surface extends between opposing peripheral wall side portions. Also shown on the top surface are recessed distal shelf 12 and sloped proximal shelf 13 that defines a locking aperture 7. The other apertures (5-6 and 8-11) provide access for slides used in the molding process and may not perform any function when used to secure a wiper arm to the connector 1. However, as new wiper arms are developed with locking arms of various sizes and shapes, one of skill in the art will recognize that these other apertures, 5-6 and 8 in particular, could be adapted to be additional locking apertures for new arms.

Those skilled in the art will recognize that connector 1 can be fabricated from any suitable material known in the art, including without limitation, rigid or elastic plastics, metals, synthetic and natural rubber compounds, etc. However, certain embodiments contemplate materials that can be molded such that connector 1 is fabricated as a single piece.

Figure 2:
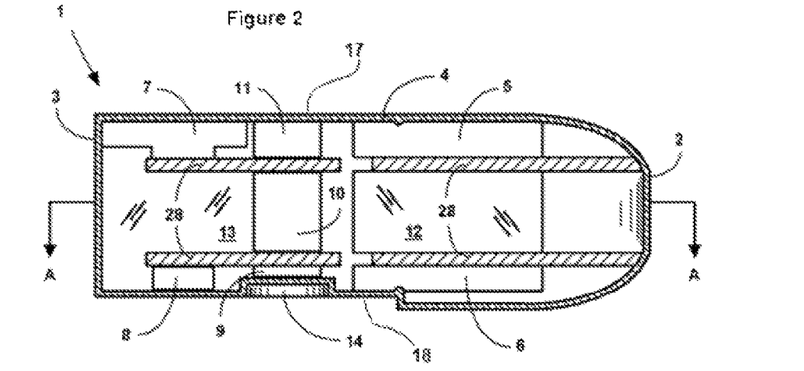
FIG. 2 is a bottom view of a preferred embodiment of the connector that illustrates the internal support structure inside the connector.

FIG. 2 is a bottom view of a preferred embodiment of the connector 1 that illustrates the internal support structure inside the connector 1. In particular, internal support walls 28 provide rigidity and structural strength to the connector 1. The support walls can extend substantially along the length of the connector continuously, or intermittently, having gaps along the way. In this embodiment, the second side 18 of the connector 1 has a spacer cavity 14 which can accommodate a spacer 25 present in certain wiper arms. Some embodiments may have not have a spacer cavity 14, while others may have one on both sides of the connector 1. Still other connectors may have nested spacer cavities 14 of differing sizes on the same side of the connector 1 at the same retaining pin aperture 15. It will be appreciated that the details of whether to have and where to put spacer cavities 14 will depend on the particular arms that an embodiment of the invention is designed to accommodate. Additionally, the second side 18 is shaped such that the width of the connector at the distal shelf 12 is greater than the width of the connector at the proximal shelf 13. Similarly, the width of the connector at each shelf 12, 13, and the location and shape of the various apertures, particularly apertures 5-8 will be dependent on the arms that an embodiment seeks to accommodate.

FIG. 2A is a section view along the line A-A of FIG. 2, which shows the support wall 28 nearer to the second side 18 of the connector. As illustrated, the support wall 28 may have a retaining pin aperture 15*c* for the retaining pin 22 of a pin-type wiper arm, and a rivet passage 19 that allows a rivet on the wiper blade to pass into an arcuate rivet clip (16*c*) which secures the connector 1 to the rivet of the wiper blade. Similarly, the support wall 28 nearer to the first side 17 of the connector 1 (not shown) may also have a pin aperture 15*b*, a rivet passage 19, and an arcuate rivet clip 16*b*. In addition to internal support walls 28, peripheral wall 4 also provide rigidity and strength to the connector 1. Other methods for connecting the connector 1 to the wiper blade known in the art are contemplated within the scope of the present invention, including having pin passages and pin clips which connect to one or more pins in the wiper blade; having one or more detents in the connector which engage shoulders in apertures or recesses in the wiper blade; having recesses in the peripheral wall of the connector that can accept and secure a rivet or pin; having deflectable or rigid pins or detents in the connector, which engage corresponding recesses, apertures or shoulders in the wiper blade; and other form-fitting or friction fitting connections and the like.

Figure 3:
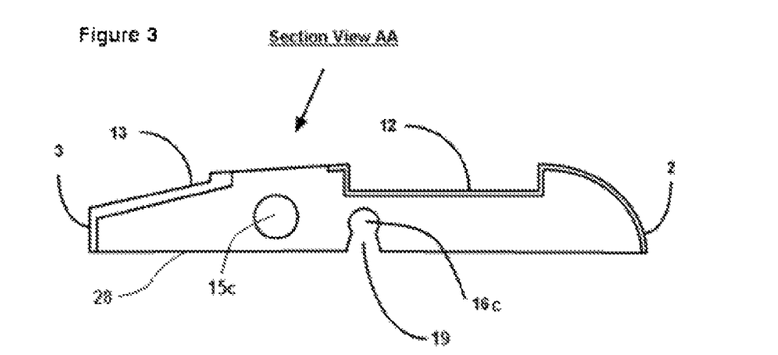
FIG. 3 shows a cross-section of a preferred embodiment of the connector along the line A-A of FIG. 2.

FIG. 3 is a side view of a preferred embodiment of a first side 17 of the connector 1. This figure also illustrates distal shelf 12 and proximal shelf 13. Retaining pin aperture 15*a* is shown aligned with retaining pin aperture 15*d* on second side 18 (shown in FIG. 4), and with the retaining pin apertures 15*b* and 15*c* in the internal support walls 28. Retaining pin apertures (15*a-d*) are sized to snugly fit retaining pins on windshield wiper arms (windshield wiper arms are illustrated in FIGS. 7-9). In certain embodiments, rivet apertures 16*a* and 16*d* (shown in FIG. 4) may be included, and are aligned with the arcuate rivet clips (16*b*, 16*c*) in the support walls 28. Alternatively, some embodiments may not include such apertures, while other embodiments may have recesses in the corresponding internal portion of the perimeter wall 4. In order to accommodate retaining pins of different sizes, some embodiments may have additional retaining pin apertures, either next to the first retaining pin aperture 15, or on the opposite side of the rivet aperture 16. The retaining pin aperture 15 may also be embodied as a flexible retaining pin clip which can accommodate more than one size of pin, depending upon the types of arms and the sizes of the pins that any particular embodiment seeks to accommodate.

Figure 4:
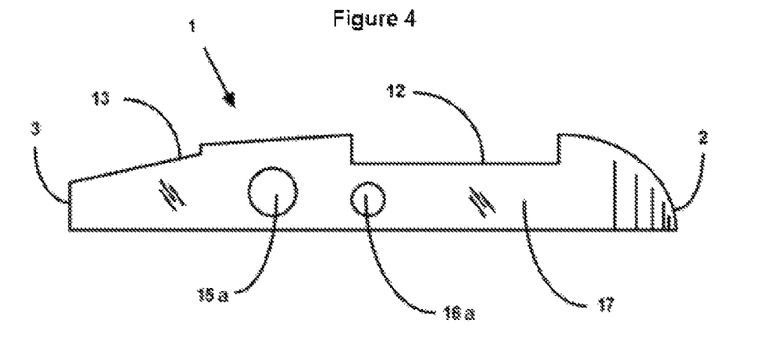
FIG. 4 is a side view of a preferred embodiment of the connector that illustrates a first side of the connector.
Figure 5:
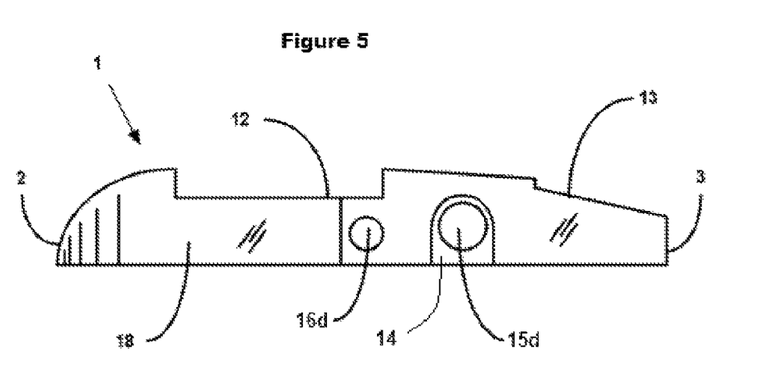
FIG. 5 is a side view of a preferred embodiment of the connector that illustrates a second side of the connector.

FIG. 4 is a side view of a preferred embodiment of a second side 18 of the connector 1. As shown, retaining pin aperture 15*d* is aligned with retaining pin aperture 15*a* on first side 17, as well as retaining pin apertures 15*b* and 15*c* in the internal support walls 28. Likewise, rivet aperture 16*d* is aligned with rivet aperture 16*a*, and with the arcuate rivet clips 16*b* and 16*c* in the internal support walls 28.

Figure 6:
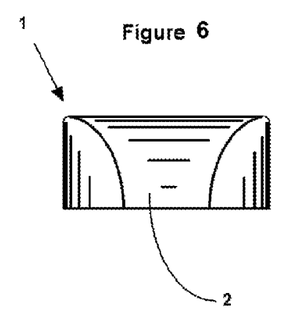
FIG. 6 is distal end view of a preferred embodiment of the connector.

FIG. 6 is distal end view of a preferred embodiment of the connector 1 that illustrates distal end 2. Those skilled in the art will recognize that the shape of distal end 2 can vary so long as it does not interfere with attachment of the connector 1 to the wiper arm.

Figure 7:
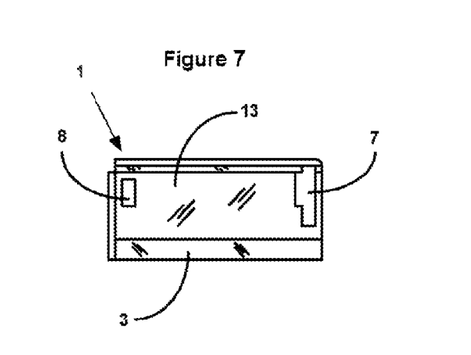
FIG. 7 is a proximal end view of a preferred embodiment of the connector.

FIG. 7 is a proximal end view of a preferred embodiment of the connector 1 that illustrates proximal end 2. Also shown in this figure is locking arm aperture 7 on proximal shelf 13.

Figure 8:
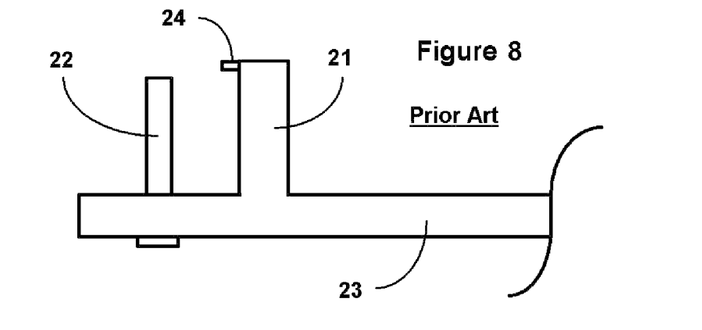
FIG. 8 is a top view of a first prior art wiper arm that illustrates the support arm, the locking arm, and the retaining pin.

FIG. 8 is a top view of a first prior art windshield wiper arm that illustrates the support arm 23, the locking arm 21, and the retaining pin 22. In certain embodiments of the connector, the retaining pin apertures 15*a-d* in the connector 1 are sized to snugly fit the retaining pin 22. When the wiper blade is slipped over the retaining pin and turned to the secured and locked position, distal shelf 12 of connector 1 will rest against the bottom side of the locking arm 21 and locking tab 24 will extend over the peripheral wall 4 on the second side 18 of the connector 1 to prevent connector 1 from sliding off of the retaining pin 22.

Figure 9:
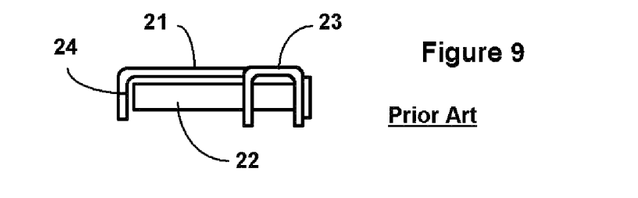
FIG. 9 is a distal end view of the wiper arm of FIG. 8 that illustrates the support arm, the locking arm, and the locking tab in relation to the retaining pin.

FIG. 9 is a distal end view of the wiper arm of FIG. 8 that illustrates the support arm 23, the locking arm 21, and the locking tab 24 in relation to the retaining pin 22. As shown in this figure, support arm 23 securely holds retaining pin 22 and maintains it in the proper orientation. The particular wiper arm shown in this figure has a locking arm 21 that extends beyond the end of the retaining pin 22.

Figure 10:
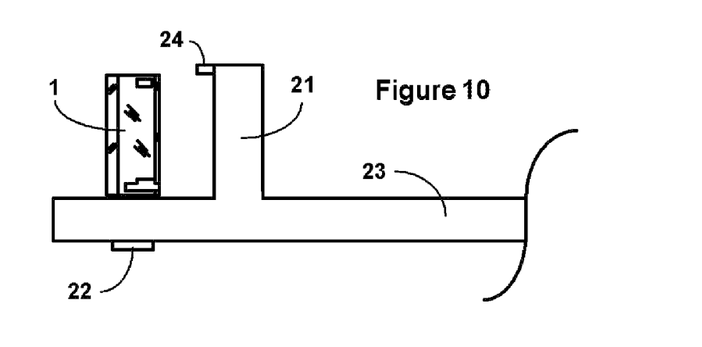
FIG. 10 is a proximal end view of a preferred embodiment of the connector connecting to the wiper arm of FIG. 8 (shown in top view) illustrating the connector slipped over the retaining pin prior to being rotated to the secured position.

FIG. 10 is a proximal end view of the preferred embodiment of the connector connecting to the wiper arm of FIG. 8 (shown in top view), illustrating the connector 1 slipped over the retaining pin 22 in the attachment position, prior to being rotated into the secured and locked position. In the attachment position, support arm 23 may be substantially perpendicular to connector 1, though attachment at other angles is also possible. This allows the retaining pin 22 to be inserted through retaining pin aperture 15*a-d* without interference from locking arm 21 and locking tab 24.

Figure 11:
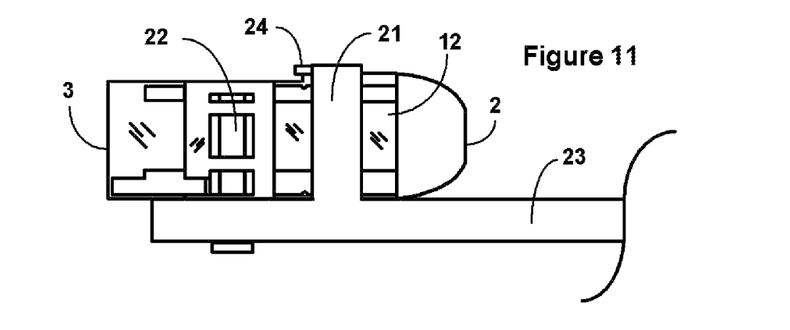
FIG. 11 is a top view of the embodiment of the connector connecting to the wiper arm of FIG. 8 illustrating the connector turned to the secured position and locked to the windshield wiper arm.

FIG. 11 is a top view of an embodiment of the connector 1 connected to the wiper arm of FIG. 8, illustrating the connector 1 secured to the windshield wiper arm with the connector in the secured and locked position. In this figure, connector 1 and the wiper blade (not shown) has been rotated about retaining pin 22 until distal shelf 12 of connector 1 comes to rest on the bottom side of locking arm 21. In this position, locking tab 24 is adjacent to the second side 18 of connector 1 thereby preventing connector 1 from sliding off of the retaining pin 22. In this embodiment, the width of the connector 1 at the distal shelf is sized to properly fit the width of the locking arm 21 of the wiper arm such that the locking tab 24 rests against the outer surface of the peripheral wall 4 near the distal shelf 12.

Figure 12:
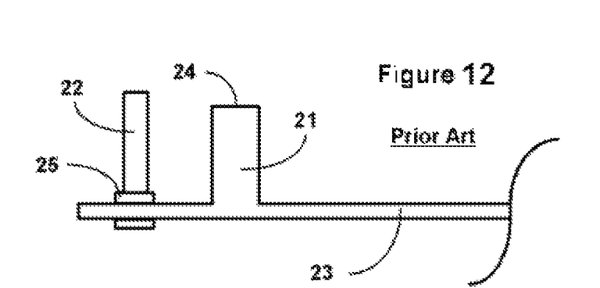
FIG. 12 is a top view of a second prior art wiper arm having a spacer that illustrates the support arm, the locking arm, and the retaining pin.

FIG. 12 is a top view of a second prior art windshield wiper arm that illustrates the support arm 23, the locking arm 21, and the retaining pin 22. This embodiment differs from the embodiment illustrated in FIGS. 8-11 in that the locking arm 21 is shorter than retaining pin 22. As a result, locking tab 24 will not rest against the outer peripheral wall 4 of connector 1. Rather, it will extend through aperture 7 on the connector 1.

Figure 13:
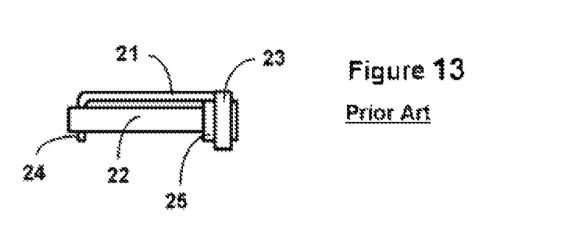
FIG. 13 is a distal end view of the wiper arm of FIG. 12 that illustrates the support arm, the locking arm, and the locking tab in relation to the retaining pin.

FIG. 13 is a distal end view of the wiper arm of FIG. 12 that illustrates the support arm 23, the locking arm 21, and the locking tab 24 in relation to the retaining pin 22. As can be seen from this figure, retaining pin 22 extends past locking arm 21 and locking tab 24. Further, this figure illustrates a new element, spacer 25, which is intended to rest inside spacer cavity 14 (illustrated above in FIG. 2).

Figure 14:
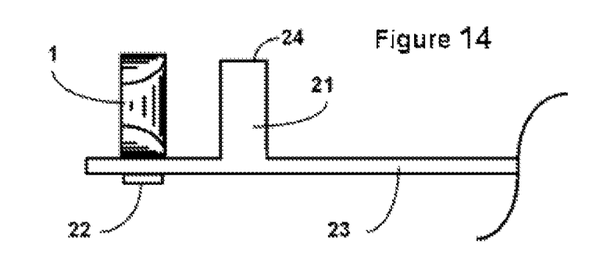
FIG. 14 is a distal end view of a preferred embodiment of the connector connecting to the wiper arm of FIG. 12 (shown in top view) illustrating the connector slipped over the retaining pin prior to being rotated to the secured position.

FIG. 14 is a distal end view of a preferred embodiment of the connector 1 connected to the wiper arm of FIG. 12 (shown in top view) illustrating the connector 1 slipped over the retaining pin 22 in the attachment position prior to being rotated into the secured and locked position. As mentioned above, spacer 25 rests inside spacer cavity 14.

Figure 15:
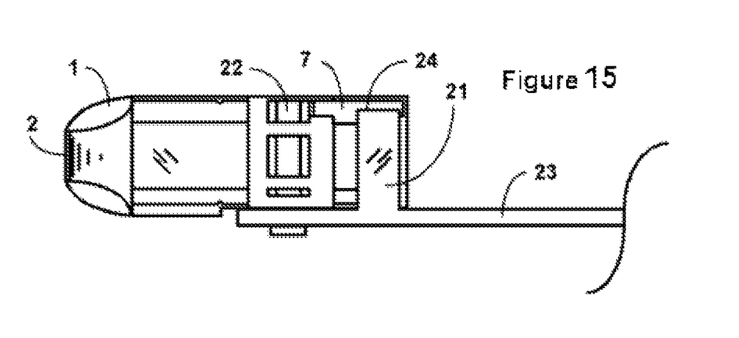
FIG. 15 is a top view of a preferred embodiment of the connector connecting to the wiper arm of FIG. 12 illustrating the connector turned to the secured position and locked to the windshield wiper arm.

FIG. 15 is a top view of an embodiment of the connector 1 illustrating the connector 1 in its secured and locked position relative to the windshield wiper arm of FIG. 12. In this embodiment, the connector 1 is reversed such that the proximal shelf 13 comes to rest against the bottom side of locking arm 21. Also illustrated in this figure is the use of locking aperture 7 to accommodate locking tab 24. This prevents the connector 1 from sliding off of the retaining pin 22 during use. In this particular embodiment, the proximal shelf has been implemented at an angle relative to the surface of the connector in order to allow this particular arm to have a negative angle relative to the wiper blade to improve performance. The angle at which the proximal shelf 13 is designed will depend on the characteristics of the particular arm sought to be accommodated, and the proximal shelf 13 may be provided with no angle at all, or with a shallower or steeper angle than the one depicted. Similarly, in certain embodiments it may be necessary to provide the distal shelf with an angle to provide an appropriate wipe angle for a particular wiper arm.

Figure 16:
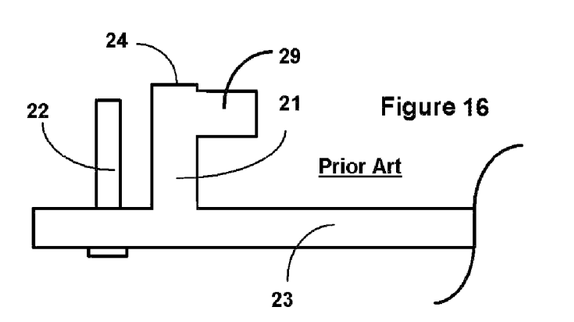
FIG. 16 is a top view of a third prior art wiper arm that illustrates the support arm, the locking arm, and the retaining pin.

FIG. 16 is a top view of another prior art a windshield wiper arm that illustrates the support arm 23, the locking arm 21, and the retaining pin 22. This embodiment illustrates an alternative configuration for locking arm 21. In this configuration, the locking arm 21 has a horizontal extension 29.

Figure 17:
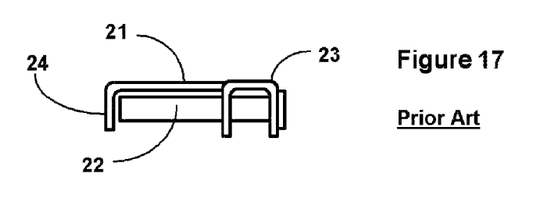
FIG. 17 is a distal end view of the wiper arm of FIG. 16 that illustrates the support arm, the locking arm, and the locking tab in relation to the retaining pin.

FIG. 17 is a distal end view of the wiper arm of FIG. 16 that illustrates the support arm 23, the locking arm 21, and the locking tab 24 in relation to the retaining pin 22. In this embodiment, the locking arm 21 extends past the end of the retaining pin 22.

Figure 18:
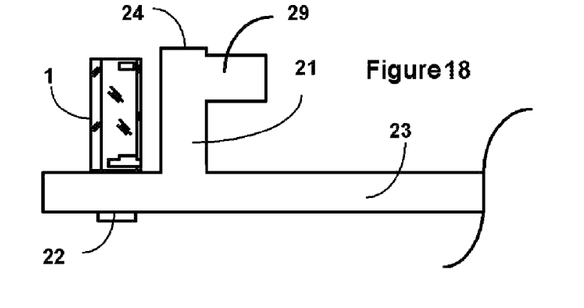
FIG. 18 is a proximal end view of a preferred embodiment of the connector connecting to the wiper arm of FIG. 16 (shown in top view) illustrating the connector slipped over the retaining pin prior to being rotated to the secured position.

FIG. 18 is a proximal end view of an embodiment of the connector connecting to the wiper arm of FIG. 16 illustrating the connector 1 engaging the retaining pin 22 in the attachment position prior to being rotated into the secured and locked position. As was the case in the previous embodiments, the connector 1 is positioned to allow it to slide onto retaining pin 22 without interference from locking arm 21 or locking tab 24.

Figure 19:
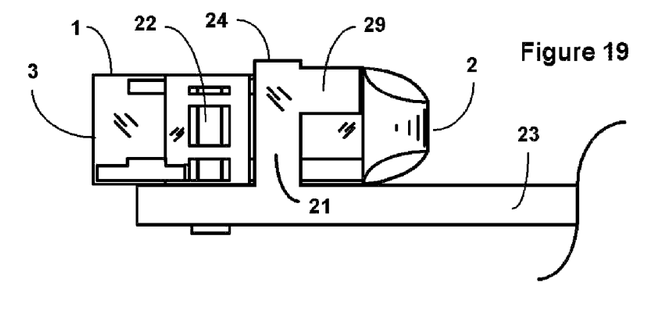
FIG. 19 is a top view of a preferred embodiment of the connector, connecting to the wiper arm of FIG. 16, illustrating the connector turned to the secured position and locked to the windshield wiper arm.

FIG. 19 is a top view of the embodiment of the connector 1 connected to the wiper arm of FIG. 16 illustrating the connector 1 secured to the windshield wiper arm with the connector 1 in the locked position. In this position, the wiper blade (not shown) has been rotated about retaining pin 22 until distal shelf 12 of connector 1 comes to rest against the bottom side of horizontal extension 29 of locking arm 21. In this position, locking tab 24 is adjacent to side 18 of connector 1. This prevents connector 1 from sliding off of the retaining pin 22. In certain wiper arms similar to this one, there may be a second locking tab extending from the horizontal extension 29, or the locking arm 21 may be sized shorter than the pin such that the locking tab does not reach the outside surface of the peripheral wall 4 of the connector. To accommodate such variances in the wiper arm, the apertures on the surface, particularly 5, 6 and 8, can be modified and shaped to handle such occurrences.

As can be seen from FIGS. 8-11 and 16-19, the same connector 1 can be used with differing windshield wiper arms. This allows a reduced inventory that can satisfy the needs of a larger number of windshield wiper arm types.

Figure 20:
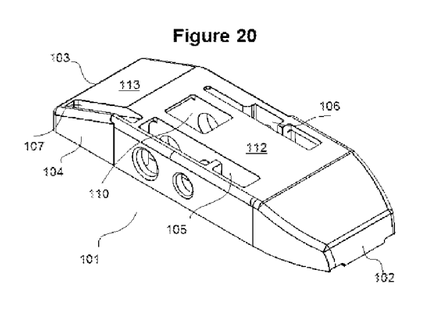
FIG. 20 is a perspective view of a second preferred embodiment of the connector, connector showing the distal, top and a first side of the connector.
Figure 21:
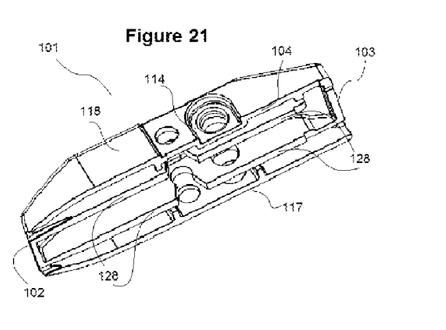
FIG. 21 is a perspective view of a second preferred embodiment of the connector showing the second side and bottom.

FIGS. 10-14 show another embodiment of the connector 101. The distinguishing characteristic of this embodiment is that the surfaces of the connector 101 have been shortened and leveled. Thus, instead of having a recessed distal shelf, this embodiment has a flat, non-recessed distal shelf 112. Likewise, this embodiment of the connector 101 has a sloped, non-recessed proximal shelf 113. FIGS. 20 and 21 show perspective views of this embodiment.

Figure 22:
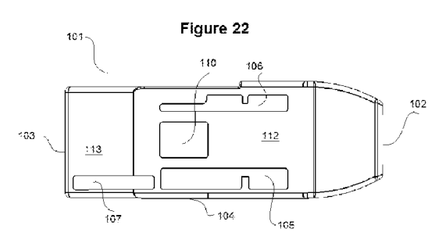
FIG. 22 is a top view of a second preferred embodiment of the connector that illustrates the aperture and outside edge used to accommodate different locking tab configurations.

FIG. 22 shows a top view of another embodiment of the connector. Comparing the apertures on the top surface of the embodiment in FIG. 1 to the apertures on the top surface of the embodiment in FIG. 22 is exemplary of the variation possible with the shape and location of the apertures on the top surface of the connector 1, 101. Like the first embodiment, the connector 101 has a distal end 102 and a proximal end 103, a peripheral wall 104, non-locking apertures 105, 106 and 110, a locking aperture 107, a distal shelf 112, and a proximal shelf 113. The width of the connector at the distal shelf 112 and at the proximal shelf 113, and the positioning of the locking aperture 107 are dependent on the arms that are intended to be accommodated. This embodiment can connect to the same wiper arms to which the first embodiment of connector 1 could connect.

Figure 23:
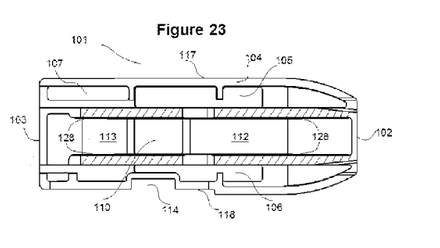
FIG. 23 is a bottom view of a second preferred embodiment of the connector that illustrates the internal support structure inside the connector.

FIG. 23 shows a bottom view of another embodiment of the connector, showing the internal support structures contained therein. Internal support walls 128 provide rigidity and structural strength to the connector 101. Likewise, the second side 118 of the connector 101 is provided with a spacer cavity 114 for receiving a spacer 25 of a wiper arm similar to that depicted in FIG. 12.

Figure 24:
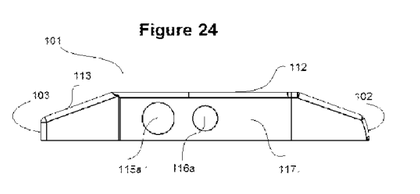
FIG. 24 is a side view of a second preferred embodiment of the connector that illustrates a first side of the connector.
Figure 25:
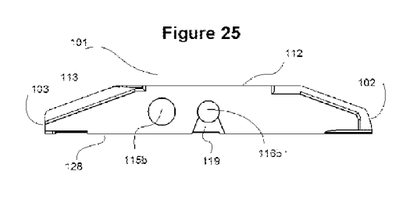
FIG. 25 is a cross-sectional side view of the internal support wall near the first side of a second preferred embodiment of the connector.
Figure 26:
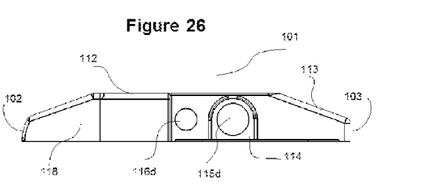
FIG. 26 is a side view of a second preferred embodiment of the connector that illustrates a second side of the connector.
Figure 27:
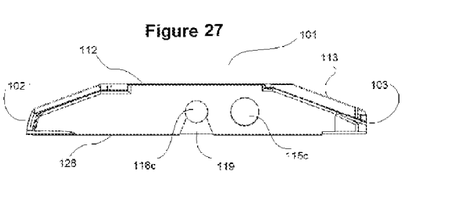
FIG. 27 is a cross-sectional side view of the internal support wall near the second side of a second preferred embodiment of the connector.

FIGS. 24 and 26 illustrate side views of the first side 117 and second side 118. Likewise, FIGS. 25 and 27 show a cross-sectional view of the internal support walls 128 near the first side 117 and second side 118, respectively. As with the first embodiment, the retaining pin apertures 115a-d are aligned with one another, and are sized to fit the retaining pin 22 of the pin-type wiper arms. Similarly, the rivet apertures 16a and 16d, and the arcuate rivet clips 16b and 16c, are aligned with one another. The internal support walls 128 have rivet passages 119 allowing the connector to connect securely to a wiper blade having a rivet. Of course, other methods of connecting the connector to a wiper blade are within the scope of the invention. FIGS. 24 and B and 26 and B illustrate the shorter, flat top surface of the connector, having sides sloping downward on each side of the rivet. Reducing the height of the connector makes it require less material (and thus makes it less expensive), gives it a lower profile for the purposes of the connector's effect on the passage of air over the windshield, and the more symmetric look allows the connector to be rotated as needed while maintaining the same aesthetic look. As before the sloped proximal shelf 113 allows an arm connecting to it to maintain a negative angle between the wiper arm and the wiper blade, and the spacer cavity 114 in the second side 118 of the connector 101 allows the connector 101 to connect a pin-type wiper blade to a wiper arm having a spacer 25.

In operation, the windshield wiper connector 1 disclosed by this invention allows a single windshield wiper to be used in conjunction with windshield wiper arms having a wide variety of configurations. This reduces manufacturing cost, inventory cost, and provides for easy replacement of windshield wipers as needed.

Another embodiment of the invention is a wiper blade provided with a connector 1 and 101 as described above, or as shown in FIGS. 1-27. The wiper blade may be of any type suitable for use with the present invention. For example, the wiper blade can be a traditional wiper blade having a plurality of frames which carry a wiper strip, and having a mounting base. Alternatively, the wiper blade may be a beam blade, having one or more spring-elastic beams, a wiper strip, and a mounting base. The wiper blade may also be a hybrid wiper blade, which has a combination of a beam and one or more frames, a wiper strip, and a mounting base. Regardless of the type of wiper blade, the connector 1, 101 can be adapted to connect to the wiper blade, for example, via a rivet on the wiper blade (which is commonly located in a mounting base or in the frame of the wiper blade) and a rivet passage 19 and arcuate rivet clips 16b, 16c on the connector 1, 101. Any other method discussed above or otherwise known in the art would also be suitable, such as having one or more pins, holes, recesses, channels, or other structure in the wiper blade, and having corresponding pin clips, detents or pins or any other structure complimentary to the structure in the connector 1, 101.

In certain embodiments, the connector 1, 101 may be connected to the wiper blade prior to connecting to the wiper arm. In certain embodiments, the connector 1, 101 may be connected to the wiper arm prior to being connected to the wiper blade. In certain embodiments, the connector 1 may either be first connected to the wiper arm or to the wiper arm.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

For example, any suitable material can be used to manufacture the connector. The number or position of the retaining pin apertures, locking apertures, or other mechanisms can vary so long as they are capable of performing their intended function.

We claim:

1. A wiper blade assembly comprising:
a wiper blade; and
a connector for connecting the wiper blade with a windshield wiper arm, the connector comprising:
   a peripheral wall having a distal side at a distal end, a proximal side at a proximal end opposing the distal end, a first side provided between the distal end and the proximal end and running longitudinally, and a second side opposing the first side and running longitudinally, the peripheral wall further having a top surface extending from the first side to the second side;
   two internal support walls each substantially parallel with one another and provided between the first and second sides, each internal support wall running longitudinally along the connector;

a rivet passage defined by a pair of arcuate rivet clips, each arcuate rivet clip provided in one of the internal support walls, the rivet passage dimensioned for accepting and securing a rivet of a wiper blade thereby securing the connector to the wiper blade;

a proximal shelf and a distal shelf provided on the top surface, the proximal shelf provided at a substantially horizontal orientation, the distal shelf sloped with respect to the proximal shelf;

a pair of retaining pin apertures, one retaining pin aperture provided in the first side and a the other retaining pin aperture provided in the second side and aligned with each other and sized to be capable of slidably accepting a retaining pin of the at least one pin-type windshield wiper arm; and a spacer cavity in one of the first or second sides, the retaining pin aperture positioned within the spacer cavity, the spacer cavity having a width measured across a diameter of the retaining pin aperture located within the spacer cavity is greater than the diameter of the retaining pin aperture, the spacer activity dimensioned to be capable of accepting a spacer of a pin-type wiper arm having the spacer.

2. The wiper blade assembly of claim 1, wherein the windshield wiper arm is one of at least two different pin-type wiper arms, and
wherein at least one said pin-type includes a locking tab extending past the arm's pin, and at least one other said pin-type includes a locking tab that does not extend past the other arm's pin.

3. The wiper blade assembly of claim 1, wherein the windshield wiper arm is one of at least two different pin-type wiper arms, and
wherein at least one said pin-type includes a spacer on the arm's pin, and at least one other pin-type does not include a spacer on the other arm's pin.

4. A wiper blade assembly comprising:
a wiper blade; and
a connector for connecting the wiper blade with a windshield wiper arm, the connector comprising:
a peripheral wall having a distal side at a distal end, a proximal side at a proximal end opposing the distal end, a first side provided between the distal end and the proximal end and running longitudinally, and a second side opposing the first side and running longitudinally, the peripheral wall further having a top surface extending from the first side to the second side;
two internal support walls each substantially parallel with one another and provided between the first and second sides, each internal support wall running longitudinally along the connector;
a rivet passage defined by a pair of arcuate rivet clips, each arcuate rivet clip provided in one of the internal support walls, the rivet passage dimensioned for accepting and securing a rivet of a wiper blade thereby securing the connector to the wiper blade;
a proximal shelf and a distal shelf provided on the top surface, the distal shelf sloped with respect to the proximal shelf; and
a pair of retaining pin apertures, one retaining pin aperture provided in the first side and a the other retaining pin aperture provided in the second side and aligned with each other and sized to be capable of slidably accepting a retaining pin of the at least one pin-type windshield wiper arm.

5. A connector for connecting a windshield wiper assembly to at least one pin-type windshield wiper arm, the connector comprising:
a peripheral wall having a distal side at a distal end, a proximal side at a proximal end opposing the distal end, a first side provided between the distal end and the proximal end and running longitudinally, and a second side opposing the first side and running longitudinally, the peripheral wall further having a top surface extending from the first side to the second side;
two internal support walls each substantially parallel with one another and provided between the first and second sides, each internal support wall running longitudinally along the connector;
a rivet passage defined by a pair of arcuate rivet clips, each arcuate rivet clip provided in one of the internal support walls, the rivet passage dimensioned for accepting and securing a rivet of a wiper blade thereby securing the connector to the wiper blade;
a proximal shelf and a distal shelf provided on the top surface, the proximal shelf provided at a substantially horizontal orientation, the distal shelf sloped with respect to the proximal shelf;
a pair of retaining pin apertures, one retaining pin aperture provided in the first side and a the other retaining pin aperture provided in the second side and aligned with each other and sized to be capable of slidably accepting a retaining pin of the at least one pin-type windshield wiper arm; and
a spacer cavity in one of the first or second sides, the retaining pin aperture positioned within the spacer cavity, the spacer cavity having a width measured across a diameter of the retaining pin aperture located within the spacer cavity is greater than the diameter of the retaining pin aperture, the spacer activity dimensioned to be capable of accepting a spacer of a pin-type wiper arm having the spacer.

6. The connector of claim 5, wherein the rivet passage is further defined by a pair rivet apertures, each rivet aperture provided in the peripheral wall.

7. The connector of claim 5, wherein the top surface is substantially flat at the proximal shelf.

8. The connector of claim 5, wherein the top surface is recessed.

9. The connector of claim 5, wherein the width of the peripheral wall is defined by the distance between the first and second sides, and wherein the width of the peripheral wall proximate the proximal shelf is greater than the width of the peripheral wall proximate the distal shelf.

10. The connector of claim 5, wherein the width of the peripheral wall is defined by the distance between the first and second sides, and wherein the width of the peripheral wall proximate the proximal end is less than the width of the peripheral wall proximate the distal end.

11. The connector of claim 5 further comprising an aperture in the top surface dimensioned and positioned to accept a locking tab that extends from a locking arm of the pintype wiper windshield wiper arm.

12. A connector for connecting a windshield wiper assembly to at least one pin-type windshield wiper arm, the connector comprising:
a peripheral wall having a distal side at a distal end, a proximal side at a proximal end opposing the distal end, a first side provided between the distal end and the proximal end and running longitudinally, and a second side opposing the first side and running longitudinally, the peripheral wall further having a top surface extending from the first side to the second side;

two internal support walls each substantially parallel with one another and provided between the first and second sides, each internal support wall running longitudinally along the connector;

a rivet passage defined by a pair of arcuate rivet clips, each arcuate rivet clip provided in one of the internal support walls, the rivet passage dimensioned for accepting and securing a rivet of a wiper blade thereby securing the connector to the wiper blade;

a proximal shelf and a distal shelf provided on the top surface, the distal shelf sloped with respect to the proximal shelf; and a pair of retaining pin apertures, one retaining pin aperture provided in the first side and a the other retaining pin aperture provided in the second side and aligned with each other and sized to be capable of slidably accepting a retaining pin of the at least one pin-type windshield wiper arm.

13. The connector for claim 12, further comprising a spacer cavity in one of the first or second sides, the retaining pin aperture positioned within the spacer cavity, the spacer cavity having a width measured across a diameter of the retaining pin aperture located within the spacer cavity is greater than the diameter of the retaining pin aperture, the spacer activity dimensioned to be capable of accepting a spacer of a pin-type wiper arm having the spacer.

14. The connector of claim 12, wherein the rivet passage is further defined by a pair rivet apertures, each rivet aperture provided in the peripheral wall.

15. The connector of claim 12, wherein the top surface is substantially flat at the proximal shelf.

16. The connector of claim 12, wherein the top surface is recessed.

17. The connector of claim 12, wherein the width of the peripheral wall is defined by the distance between the first and second sides, and wherein the width of the peripheral wall proximate the proximal shelf is greater than the width of the peripheral wall proximate the distal shelf.

18. The connector of claim 12, wherein the width of the peripheral wall is defined by the distance between the first and second sides, and wherein the width of the peripheral wall proximate the proximal end is less than the width of the peripheral wall proximate the distal end.

* * * * *